United States Patent
Yoon et al.

(10) Patent No.: US 8,044,830 B2
(45) Date of Patent: Oct. 25, 2011

(54) METHOD AND AN APPARATUS FOR PROCESSING A SIGNAL

(75) Inventors: Sung Yong Yoon, Seoul (KR); Hee Suk Pang, Seoul (KR); Dong Soo Kim, Seoul (KR); Hyun Kook Lee, Seongnam (KR); Jae Hyun Lim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 12/678,713

(22) PCT Filed: Sep. 22, 2008

(86) PCT No.: PCT/KR2008/005612
§ 371 (c)(1),
(2), (4) Date: Mar. 17, 2010

(87) PCT Pub. No.: WO2009/038422
PCT Pub. Date: Mar. 26, 2009

(65) Prior Publication Data
US 2010/0201550 A1     Aug. 12, 2010

Related U.S. Application Data

(60) Provisional application No. 60/974,073, filed on Sep. 20, 2007.

(51) Int. Cl.
*H03M 7/40* (2006.01)
(52) U.S. Cl. .......................................... 341/67; 341/106
(58) Field of Classification Search .................. 341/50, 341/67, 106; 704/229, 230, 200.1, 500–504
See application file for complete search history.

(56) References Cited

U.S. PATENT DOCUMENTS

| | | | |
|---|---|---|---|
| 6,915,255 B2 * | 7/2005 | Watanabe | 704/200.1 |
| 7,657,429 B2 * | 2/2010 | Tsushima | 704/230 |
| 7,752,041 B2 * | 7/2010 | Kim et al. | 704/229 |
| 2003/0103679 A1 | 6/2003 | Etoh et al. | |
| 2003/0202588 A1 | 10/2003 | Yu et al. | |
| 2004/0037360 A1 | 2/2004 | Moon | |
| 2006/0093038 A1 | 5/2006 | Boyce | |
| 2006/0198440 A1 | 9/2006 | Yin et al. | |

FOREIGN PATENT DOCUMENTS

| | | | |
|---|---|---|---|
| WO | WO 2005/104095 A1 | 11/2005 | |
| WO | WO 2007/008116 A1 | 7/2007 | |

* cited by examiner

*Primary Examiner* — Brian Young
(74) *Attorney, Agent, or Firm* — Birch, Stewart, Kolasch & Birch, LLP

(57) ABSTRACT

A method of processing a signal is disclosed. The present invention includes receiving a maximum number of band and a code value of at least one section length, calculating a bit number corresponding to the code value of the at least one section length using the maximum number of the band, and obtaining the section length information by decoding the code value of the section length based on the bit number. A method of processing a signal is disclosed. The present invention includes receiving factor information of a current frame, receiving flag information indicating whether a coding mode of the factor information is an absolute value mode or a relative value mode, and obtaining factor data of the current frame using factor data of a previous frame and the received factor information based on the flag information.

13 Claims, 16 Drawing Sheets

| (a) Section length (sect_len) (value to code) | 4 | 2 | 3 | 1 |
| --- | --- | --- | --- | --- |
| (a-1) Temporary section length (sect_len_temp) | 4 | 2 | 3 | 1 |
| (b) Current accumulative number(sfb_acc) | 0 | 4 | 6 | 9 |
| (c) Current remaining number(range) | 10 | 6 | 4 | 1 |
| (d) 1st bit number (ceil(log$_2$(range))) | 4 | 3 | 2 | 0 |
| (e) Final bit number (min(ceil(log$_2$(range)),A)) | 3 | 3 | 2 | 0 |
| (f) Section length code value (sect_len-1) (binary) | 011 | 001 | 10 | |
| (g) Bit number(used bits) | 3 | 3 | 2 | 0 |

3+3+2+0=8bits (B)

| (a) Section length (sect_len) (value to code) | 4 | 2 | 3 | 1 |
| --- | --- | --- | --- | --- |
| (f) Section length code value (sect_len)(binary) | 100 | 010 | 011 | 001 |
| (g) Bit number(used bits) | 3 | 3 | 3 | 3 |

3+3+3+3=12bits

| | | | |
|---|---|---|---|
| (a) Section length (sect_len) (value to code) | 35 | | 5 |
| (a-1) Temporary section length (sect_len_temp) | 35 | 4 | 5 |
| (a-2) Partitioned section length | 31 | 4 | 5 |
| (b) Current accumulative number (sfb_acc) | 0 | | 35 |
| (c) Current remaining number(range) | 40 | 9 | 5 |
| (d) 1st bit number (ceil(log$_2$(range))) | 6 | 4 | 3 |
| (e) Final bit number (min(ceil(log$_2$(range)),A)) | 5 | 4 | 3 |
| (f) Section length code value (sect_len-1) (binary) | 11111 | 0011 | 100 |
| (g) Bit number(used bits) | 5 | 4 | 3 |

5+4+3=12bits (B)

| | | | |
|---|---|---|---|
| (a) Section length (sect_len) (value to code) | 35 | | 5 |
| (a-2) Partitioned section length (sect_len) | 31 | 4 | 5 |
| (f) Section length code value (sect_len)(binary) | 11111 | 00100 | 00101 |
| (g) Bit number(used bits) | 5 | 5 | 5 |

5+5+5=15bits

FIG. 11
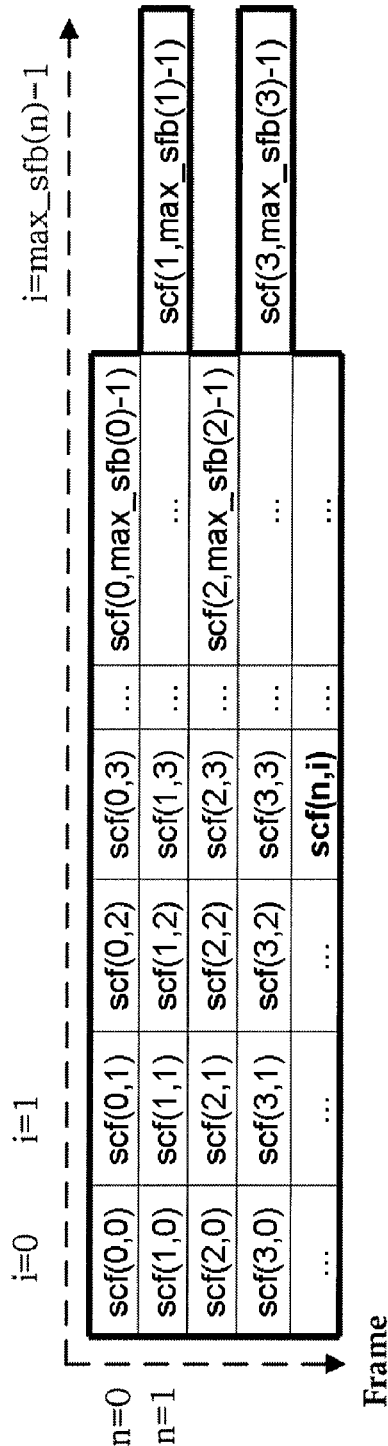
(A)
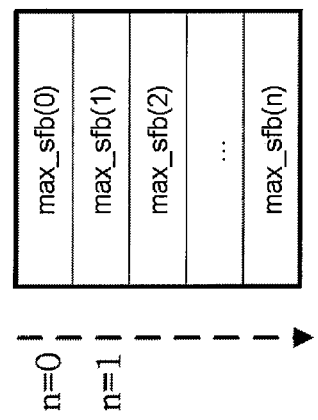
(B)

| flag(0)=0 | scf(0,0) | scf(0,1)<br>-scf(0,0) | scf(0,2)<br>-scf(0,1) | scf(0,3)<br>-scf(0,2) | ... | scf(0,max_sfb(0)-1)<br>-scf(0,max_sfb(0)-2) | |
| --- | --- | --- | --- | --- | --- | --- | --- |
| flag(1)=1 | scf(1,0)<br>-gg(0) | scf(1,1)<br>-scf(1,0) | scf(1,2)<br>-scf(1,1) | scf(1,3)<br>-scf(1,2) | ... | | scf(1,max_sfb(1)-1)<br>-scf(1,max_sfb(1)-2) |
| flag(2)=1 | scf(2,0)<br>-gg(1) | scf(2,1)<br>-scf(2,0) | scf(2,2)<br>-scf(2,1) | scf(2,3)<br>-scf(2,2) | ... | scf(2,max_sfb(2)-1)<br>-scf(2,max_sfb(2)-2) | |
| | scf(3,0)<br>-gg(3) | scf(3,1)<br>-scf(3,0) | scf(3,2)<br>-scf(3,1) | scf(3,3)<br>-scf(3,2) | ... | | scf(3,max_sfb(3)-1)<br>-scf(3,max_sfb(3)-2) |
| ... | ... | ... | ... | ... | ... | | |
| flag(n) | | | | scf(n,i)<br>-scf(n,i-1) | | | |

(B)

| gg(0) | scf(0,0)<br>-gg(0) | scf(0,1)<br>-scf(0,0) | scf(0,2)<br>-scf(0,1) | scf(0,3)<br>-scf(0,2) | ... | scf(0,max_sfb(0)-1)<br>-scf(0,max_sfb(0)-2) | |
| --- | --- | --- | --- | --- | --- | --- | --- |
| gg(1) | scf(1,0)<br>-gg(1) | scf(1,1)<br>-scf(1,0) | scf(1,2)<br>-scf(1,1) | scf(1,3)<br>-scf(1,2) | ... | | scf(1,max_sfb(1)-1)<br>-scf(1,max_sfb(1)-2) |
| gg(2) | scf(2,0)<br>-gg(2) | scf(2,1)<br>-scf(2,0) | scf(2,2)<br>-scf(2,1) | scf(2,3)<br>-scf(2,2) | ... | scf(2,max_sfb(2)-1)<br>-scf(2,max_sfb(2)-2) | |
| | scf(3,0)<br>-gg(3) | scf(3,1)<br>-scf(3,0) | scf(3,2)<br>-scf(3,1) | scf(3,3)<br>-scf(3,2) | ... | | scf(3,max_sfb(3)-1)<br>-scf(3,max_sfb(3)-2) |
| ... | ... | ... | ... | ... | ... | | |
| gg(n) | | | | scf(n,i)<br>-scf(n,i-1) | | | |

METHOD AND AN APPARATUS FOR PROCESSING A SIGNAL

This application is the National Phase of PCT/KR2008/005612 filed on Sep. 22, 2008, which claims priority under 35 U.S.C. 119(e) to U.S. Provisional Application No. 60/974,073 filed on Sep. 20, 2007, all of which are hereby expressly incorporated by reference into the present application.

TECHNICAL FIELD

The present invention relates to an apparatus for processing a signal and method thereof. Although the present invention is suitable for a wide scope of applications, it is particularly suitable for performing lossless encoding or decoding a signal.

BACKGROUND ART

Generally, in order to encode an audio or video signal, data is quantized and lossless encoding is then performed on the quantized data.

DISCLOSURE OF THE INVENTION

Technical Problem

However, in this case, audio data or video data are transferred as well as various kinds of informations (e.g., Huffman codebook information, scale factor, etc.) for decoding the informations and numerous bits are requires for transferring these informations.

Technical Solution

Accordingly, the present invention is directed to an apparatus for processing a signal and method thereof that substantially obviate one or more of the problems due to limitations and disadvantages of the related art.

An object of the present invention is to provide an apparatus for processing a signal and method thereof, by which the number of bits can be reduced in transferring codebook information.

Another object of the present invention is to provide an apparatus for processing a signal and method thereof, by which length information (number information) of a band (e.g., a scale factor band) using the same kind of codebook can be efficiently transferred.

A further object of the present invention is to provide an apparatus for processing a signal and method thereof, by which factor data (e.g., a scale factor data or maximum number of scale factor bands, etc.) can be efficiently transferred using data of a previous frame.

Advantageous Effects

Accordingly, the present invention provides the following effects or advantages.

First of all, it is able to considerably save the number of bits required for coding in a manner of coding length information (or number information) of bands, which use the same codebook, with the variable bit number instead of the fixed bit number.

Secondly, it is also able to considerably save the number of bits required for coding in a manner of coding a value resulting from subtracting 1 from length information (or number information) of bands, which use the same codebook, instead of coding the original length information intact.

Thirdly, it is able to reduce the bit number in a manner of transmitting a difference value between factor data of a current frame and factor data of a previous frame instead of transferring the factor data of the current frame as it is.

Fourthly, since both an absolute value mode for transferring factor data intact and a relative value mode for transferring a difference value are usable together, the present invention is able to support a random access while saving the bit number.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 shows a first example of a section length bit number calculating process and a coding result;

FIG. 6 shows a second example of a section length bit number calculating process and a coding result;

FIG. 11 is a diagram for explaining concepts of scale factor data and the maximum number of scale factor bands;

FIG. 12 is a diagram for explaining a scheme for transmitting scale factor data;

BEST MODE

Figure 1:
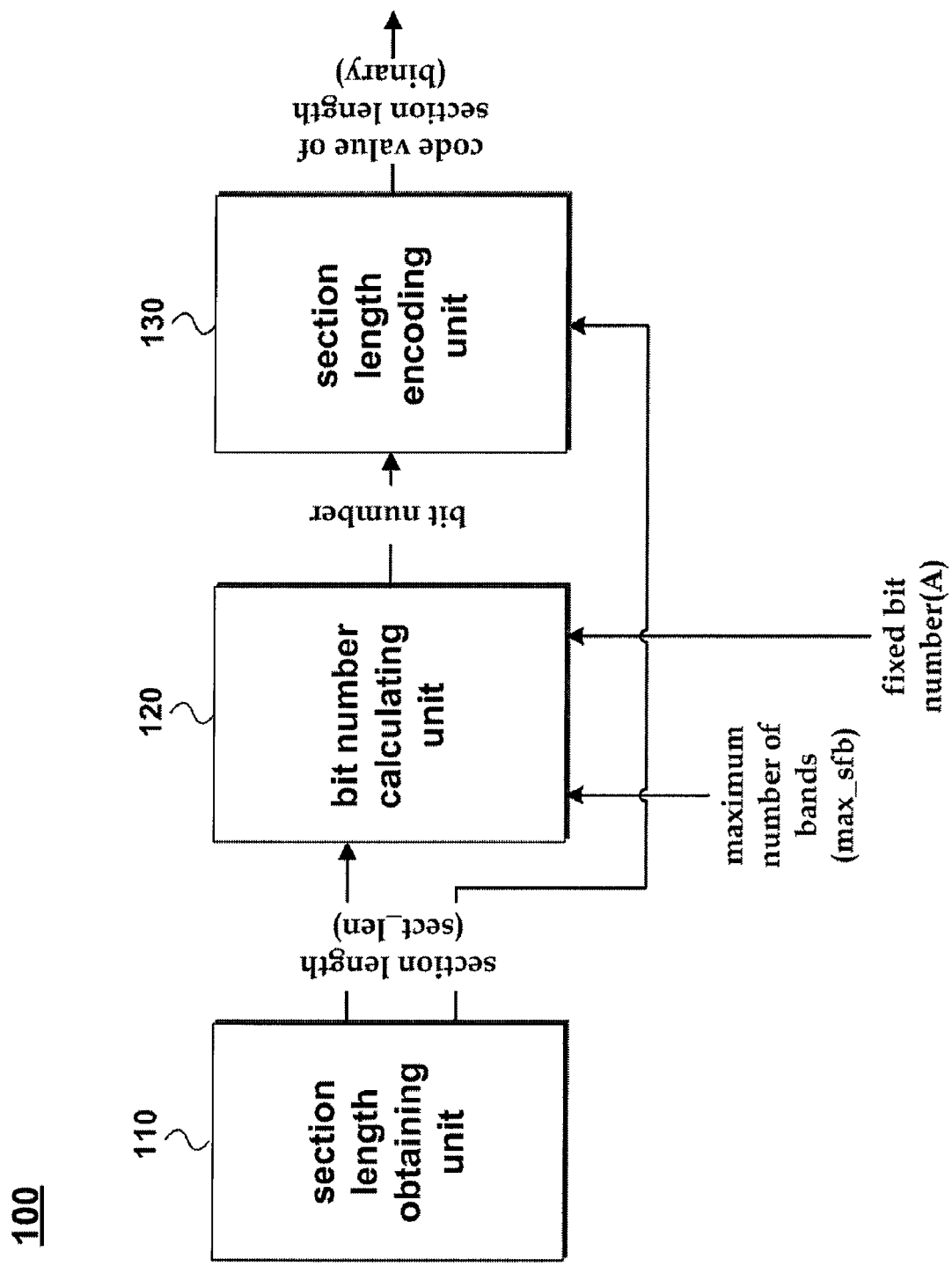
FIG. 1 is a configurational diagram of a signal encoding apparatus according to one embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a signal according to the present invention includes receiving factor information of a current frame, receiving flag information indicating whether a coding mode of the factor information is an absolute value mode or a relative value mode, and obtaining factor data of the current frame using factor data of a previous frame and the received factor information based on the flag information.

According to the present invention, the factor data can correspond to a first one of bands for transferring the factor information.

According to the present invention, the obtaining step can be performed if the coding mode of the factor information is the relative value mode.

According to the present invention, the method can further include the step of if the coding mode of the factor information is the absolute value mode, obtaining the factor data of the current frame using the factor information.

According to the present invention, the factor data can include at least one of scale factor data and a scale factor band maximum number.

According to the present invention, the factor data includes first factor data and second factor data, the flag information includes first flag information and second flag information, and the factor data obtaining step can include obtaining the first factor data using the first factor data of a previous frame and the received first factor data based on the first flag information and obtaining the second factor data using the second factor data of a previous frame and the received second factor data based on the second flag information.

To further achieve these and other advantages and in accordance with the purpose of the present invention, an apparatus for processing a signal includes a receiving unit receiving factor information of a current frame, the receiving unit receiving flag information indicating whether a coding mode of the factor information is an absolute value mode or a relative value mode and a factor decoding unit obtaining factor data of the current frame using factor data of a previous frame and the received factor information based on the flag information.

According to the present invention, the factor data can correspond to a first one of bands for transferring the factor information.

According to the present invention, the factor decoding unit can obtain the factor data of the current frame using the factor data of a previous frame if the coding mode of the factor information is the relative value mode.

According to the present invention, if the coding mode of the factor information is the absolute value mode, the factor data of the current frame can be obtained using the factor information.

According to the present invention, the factor data can include at least one of scale factor data and a scale factor band maximum number.

According to the present invention, the factor data includes first factor data and second factor data, the flag information includes first flag information and second flag information, wherein the factor decoding unit obtains the first factor data using the first factor data of a previous frame and the received first factor data based on the first flag information, and the factor decoding unit obtains the second factor data using the second factor data of a previous frame and the received second factor data based on the second flag information.

To further achieve these and other advantages and in accordance with the purpose of the present invention, a method of processing a signal includes determining flag information indicating whether a coding mode of the factor information is an absolute value mode or a relative value mode based on factor data of a current frame, obtaining factor information of the current frame using factor data of a previous frame and the factor data of the current frame based on the flag information, and transferring the flag information and the factor information.

To further achieve these and other advantages and in accordance with the purpose of the present invention, a method of processing a signal includes receiving factor information of a current frame and if the factor information corresponds to first factor data, obtaining the first factor data using the factor information without using a global gain belonging to the current frame, wherein the first factor data corresponds to a first one of bands for transferring the factor information.

To further achieve these and other advantages and in accordance with the purpose of the present invention, an apparatus for processing a signal includes a receiving unit receiving factor information of a current frame and a factor data obtaining unit, if the factor information corresponds to first factor data, the factor data obtaining unit obtains the first factor data using the factor information without using a global gain belonging to the current frame, wherein the first factor data corresponds to a first one of bands for transferring the factor information.

To further achieve these and other advantages and in accordance with the purpose of the present invention, a method of processing a signal according to the present invention includes receiving factor information of a current frame, receiving flag information indicating whether a coding mode of the factor information is an absolute value mode or a relative value mode, and obtaining factor data of the current frame using factor data of a previous frame and the received factor information based on the flag information.

According to the present invention, the factor data can correspond to a first one of bands for transferring the factor information.

According to the present invention, the obtaining step can be performed if the coding mode of the factor information is the relative value mode.

According to the present invention, the method can further include the step of if the coding mode of the factor information is the absolute value mode, obtaining the factor data of the current frame using the factor information.

According to the present invention, the factor data can include at least one of scale factor data and a scale factor band maximum number.

According to the present invention, the factor data includes first factor data and second factor data, the flag information includes first flag information and second flag information, and the factor data obtaining step can include obtaining the first factor data using the first factor data of a previous frame and the received first factor data based on the first flag information and obtaining the second factor data using the second factor data of a previous frame and the received second factor data based on the second flag information.

To further achieve these and other advantages and in accordance with the purpose of the present invention, an apparatus for processing a signal includes a receiving unit receiving factor information of a current frame, the receiving unit receiving flag information indicating whether a coding mode of the factor information is an absolute value mode or a relative value mode and a factor decoding unit obtaining factor data of the current frame using factor data of a previous frame and the received factor information based on the flag information.

According to the present invention, the factor data can correspond to a first one of bands for transferring the factor information.

According to the present invention, the factor decoding unit can obtain the factor data of the current frame using the factor data of a previous frame if the coding mode of the factor information is the relative value mode.

According to the present invention, if the coding mode of the factor information is the absolute value mode, the factor data of the current frame can be obtained using the factor information.

According to the present invention, the factor data can include at least one of scale factor data and a scale factor band maximum number.

According to the present invention, the factor data includes first factor data and second factor data, the flag information includes first flag information and second flag information, wherein the factor decoding unit obtains the first factor data using the first factor data of a previous frame and the received first factor data based on the first flag information, and the factor decoding unit obtains the second factor data using the second factor data of a previous frame and the received second factor data based on the second flag information.

To further achieve these and other advantages and in accordance with the purpose of the present invention, a method of processing a signal includes determining flag information indicating whether a coding mode of the factor information is an absolute value mode or a relative value mode based on factor data of a current frame, obtaining factor information of the current frame using factor data of a previous frame and the factor data of the current frame based on the flag information, and transferring the flag information and the factor information.

To further achieve these and other advantages and in accordance with the purpose of the present invention, a method of processing a signal includes receiving factor information of a current frame and if the factor information corresponds to first factor data, obtaining the first factor data using the factor information without using a global gain belonging to the current frame, wherein the first factor data corresponds to a first one of bands for transferring the factor information.

To further achieve these and other advantages and in accordance with the purpose of the present invention, an apparatus for processing a signal includes a receiving unit receiving factor information of a current frame and a factor data obtaining unit, if the factor information corresponds to first factor data, the factor data obtaining unit obtains the first factor data using the factor information without using a global gain belonging to the current frame, wherein the first factor data corresponds to a first one of bands for transferring the factor information.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

First of all, coding in the present invention can be understood as the concept for including both encoding and decoding.

Secondly, in case of transforming an audio signal into a frequency spectrum by performing modified discrete cosine transform (MDCT) or the like, a scale factor band in the present invention may mean a group of the MDCT coefficients. By way of non-limiting examples for the meaning, the scale factor band in the present invention can also be understood as meaning a frequency band of various usages.

FIG. 1 is a configurational diagram of a signal encoding apparatus according to one embodiment of the present invention.

Referring to FIG. 1, a signal encoding apparatus 100 according to one embodiment of the present invention includes a section length obtaining unit 110, a bit number calculating unit and a section encoding unit 130. The section length obtaining unit 110 determines a codebook number for each scale factor band and then obtains a section length based on the determined scale factor band index and codebook number.

Figure 2:
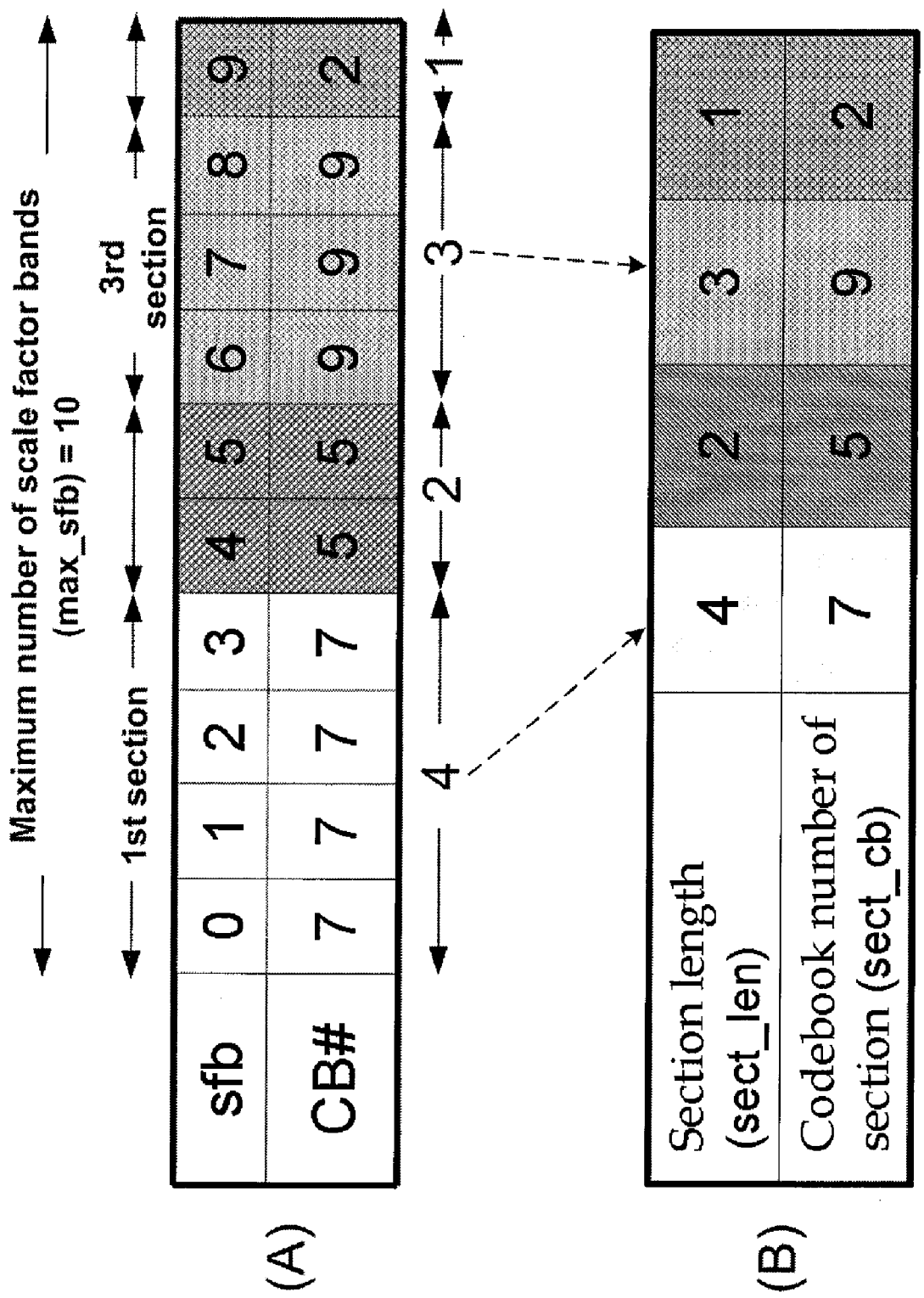
FIG. 2 shows a first example of scale factor bands, sections and section lengths.
Figure 3:
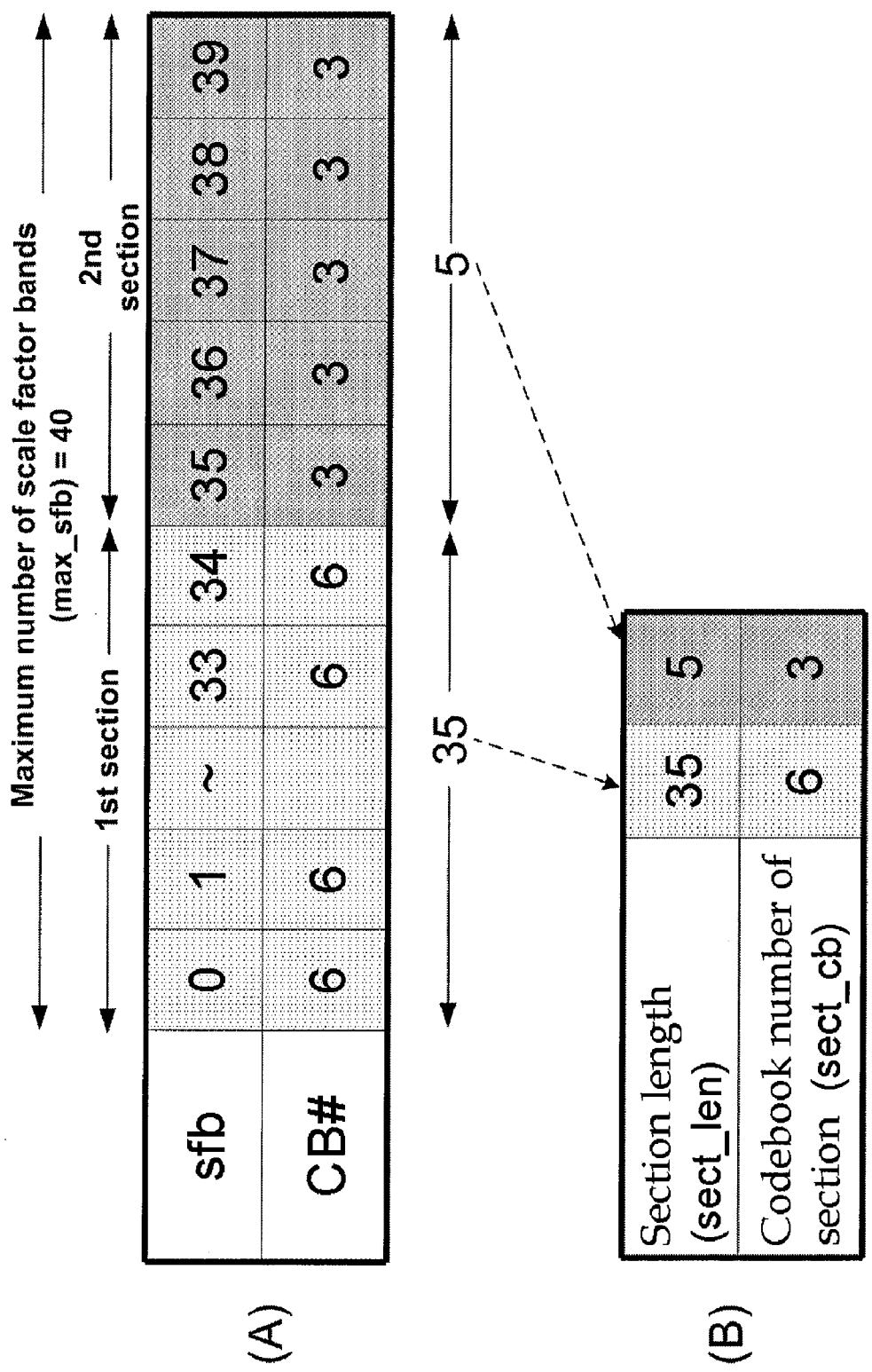
FIG. 3 shows a second example of scale factor bands, sections and section lengths.

FIG. 2 shows a first example of scale factor bands, sections and section lengths, and FIG. 3 shows a second example of scale factor bands, sections and section lengths.

Referring to (A) of FIG. 2, an index of a scale factor band sfb exists from 0 to 9. Hence, it is able to know that the maximum number max_sfb of scale factor bands is 10. In this case, the maximum number max_sfb of scale factor bands means the total number of scale factor bands. In case of an area over the maximum number max_sfb of scale factor bands, spectral data is not transferred. The maximum number max_sfb may have a fixed value irrespective of frame but may have a value that varies in each frame.

Meanwhile, a codebook number HCB# for identifying a codebook exists for each scale factor band sfb. In this case, the codebook means a table required for decoding a lossless encoded signal an may include Huffman codebook or the like. By way of non-limiting examples, the codebook can include one of other type codebooks. In this case, there can exist consecutive scale factor bands that use the same codebook. A set of theses consecutive scale factor bands shall be named 'section' and the number or length of the scale factor bands shall be named 'section length'.

Referring to (A) and (B) of FIG. 2, a first section is a set of scale factor bands having a codebook number '7' and includes scale factor bands 0 to 3. Hence, a section length sect_len of the first section is 4 and a section codebook number sect_cb of the first section becomes 7. A third section is a set of scale factor bands having a codebook number '3', includes scale factor bands 6 to 8, and a section length of the third section becomes 3.

Referring to FIG. 3, in case of a second example, a first section includes scale factor bands 0 to 34, a section length sect_len is 35, and a section length of a second section is 5.

Thus, as shown in (A) of FIG. 2 and (A) of FIG. 3, a codebook number can be transferred per scale factor band. Yet, in case that at least two scale factor bands sharing a codebook number are consecutive, it is more advantageous that a section length sect_len and a codebook number sect_cb of a section, as shown in (B) of FIG. 2 and (B) of FIG. 3.

Referring now to FIG. 1, the section length obtaining unit 110 determines the codebook for each scale factor and then obtains the aforesaid section length sect_len based on the determined codebook. The bit number calculating unit 120 calculates a bit number required for coding of each section length sect_len using a maximum number max_sfb of scale factor bands and a fixed bit number A. In particular, according to the number of remaining scale factor bands sfb, it is able to determine the bit number of the section length as variable. And, is details will be explained later in this disclosure.

The section length obtaining unit 130 generates code value of section length. In this case, the code vale may be binary numbers, which does not put limitations on the present invention.

Figure 4:
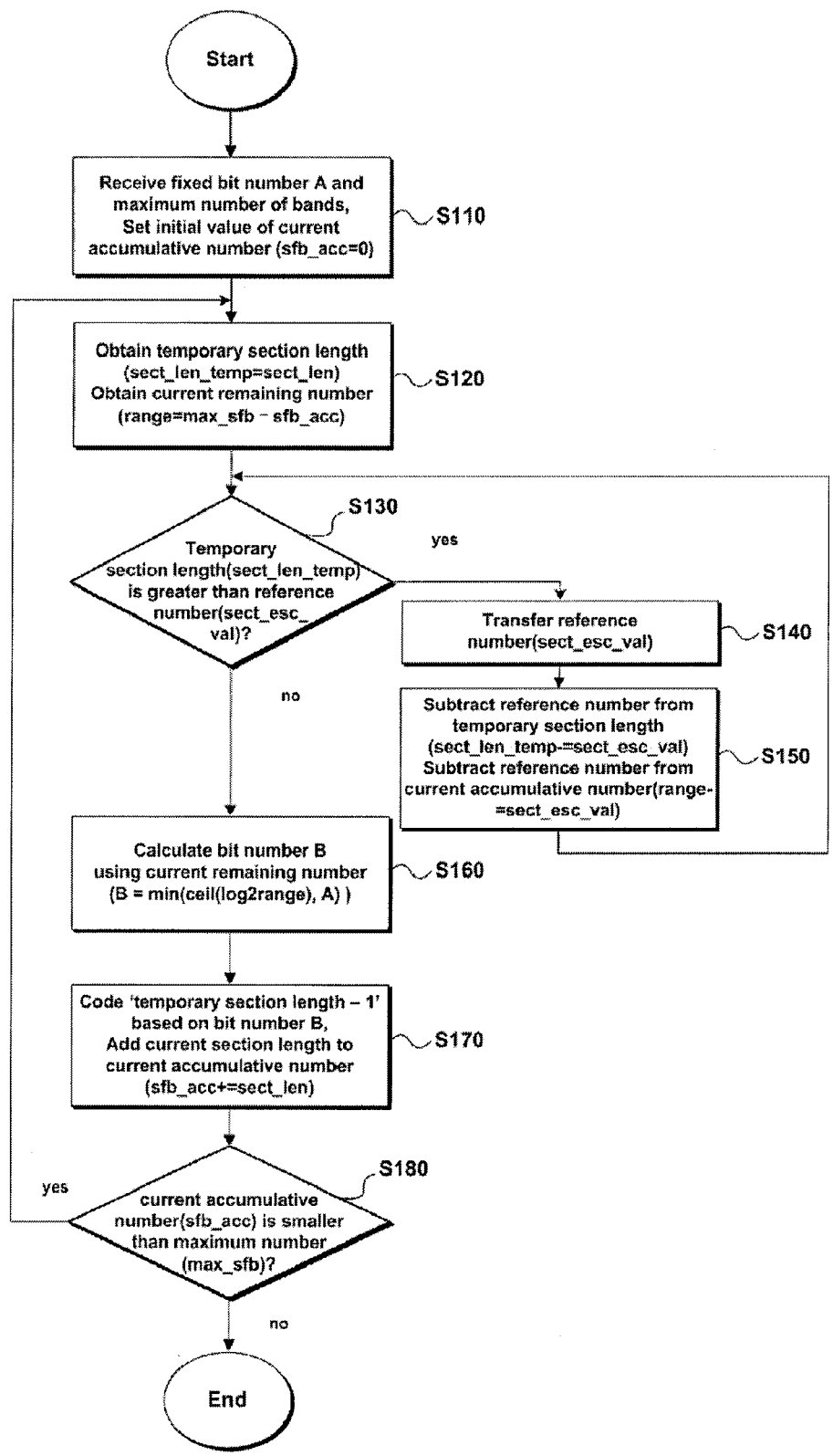
FIG. 4 is a flowchart of a signal encoding method according to one embodiment of the present invention.

FIG. 4 is a flowchart of a signal encoding method according to one embodiment of the present invention. FIG. 5 shows a first example of a section length bit number calculating process and a coding result, and FIG. 6 shows a second example of a section length bit number calculating process and a coding result. First of all, the flowchart of the signal encoding method is explained with reference to FIG. 4 and FIG. 5. Secondly, the first example is explained with reference to FIG. 5 and the second example is explained with reference to FIG. 6. Meanwhile, the steps shown in FIG. 4 can be performed by the bit number calculating unit 120 and the section length encoding unit 130 described with reference to FIG. 1.

Referring to FIG. 4, a fixed bit number A and a maximum number max_sfb of scale factor bands are received and an initial value of a current accumulative number sfb_acc is set to 0 [S110]. In this case, the fixed bit number A and the maximum number max_sfb of scale factor bands may have the values preset on system. In case of a long frame, the 'A' may be 5. In case of a short frame, the 'A' may be 3. By way of non-limiting examples, the present invention is not limited to this.

FIG. 5 shows the result corresponding to the first example shown in FIG. 2, and FIG. 6 shows the result corresponding to the second example shown in FIG. 3. First of all, (A) of FIG. 5 shows the result according to one embodiment of the present invention and (B) of FIG. 5 shows the result of coding by a fixed bit number (e.g., 3 bits) to be compared with one embodiment of the present invention. Referring to (A) of FIG. 5, consequently, bit numbers for coding section lengths sect_len 4, 2, 3 and 1 are 3, 3, 2 and 0, respectively. And, it can be observed that total 8 bits are used. Comparing to this, referring to (B) of FIG. 5, total 12 bits are used due to the encoding by a fixed bit number of 3 bits each. Hence, it can be observed that the case according to one embodiment of the present invention is able to save total 4 bits more than those of the case of using the fixed bit number.

Referring now to FIG. 4, a temporary section length sect_len_temp is set using a section length sect_len [sect_len_temp=sect_len] [S120]. In this case, the temporary section length sect_len_temp means a section length of the section to be currently encoded. And, its difference from the section length sect_len will be explained later together with the second example with reference to FIG. 6. A current reaming number (range) is obtained using a maximum number max_sfb and a current accumulative number sfb_acc [range=max_sfb−sfb_acc] [S120]. The current accumulative number sfb_acc is the number of parsing or coding completed bands and the current remaining number (range) means the number of parsing or coding incomplete bands. According to a size off the remaining number (range), the number of cases for a value of the current section length or the temporary section length is determined. Hence, the bit number of the current section length is determined in proportion to the current remaining number (range) approximately. In this case, the proportion means not only the direct proportion (y=ax) but also the increase of y in proportion to the increase of x. Looking into a row (b) in (A) of FIG. 5, a current accumulative number sfb_acc is '0, 4, 6, 9' and a current remaining number (range) is '10, 6, 4, 1' in inverse proportion to the current accumulative number approximately. In this case, the inverse proportion means not only the relation of 'y=a/x' but also the decrease of y in proportion to the increase of x.

Meanwhile, it is decided whether a temporary section length sect_len_temp is greater than a reference number sect_esc_val. In this case, the reference number sect_esc_val is related to the number that can be expressed as a fixed bit number A. And, the reference number sect_esc_val can be represented as follows.

$$\text{sect\_esc\_val}=2^A-1,\qquad\text{[Formula 1]}$$

where sect_esc_val is a reference number and 'A' is a fixed bit number.

If the reference number sect_esc_val is greater than the fixed bit number A [S130], it is represented as the fixed bit number A and the rest part is separately coded. In particular, after the reference number sect_esc_val has been transferred [S140], the reference number sect_esc_val is subtracted from the temporary section number sect_len_temp [sect_len_temp−=sect_esc_val], the reference number sect_esc_val is subtracted from a current remaining number [range−=sect_sect_esc_val], the step S130 is then executed again [S150].

In the first example shown in FIG. 5, since the fixed bit number A is 3 and the reference number sect_esc_val is 7, it never happens that all section length exceeds 7. Yet, in the second example shown in FIG. 6, the fixed bit number A is 5 and the reference number is 31. Since there exists a section length '35' that exceeds '31', its details will be explained later.

If the temporary section length does not exceed the reference number in the step S130 ['no' in the step S130], a bit number B is calculated using the current remaining number (range) [S160]. The bit number B can be calculated using Formula 2 or Formula 3.

$$B=\min(\operatorname{ceil}(\log_2(\text{range})),A),\qquad\text{[Formula 2]}$$

Where min (x, y) is a minimum value of x and y, ceil(z) is a smallest value among integers equal to or smaller than 'z', 'range' is current remaining number (max_sfb−sfb_acc), and 'A' is a fixed bit number.

In Formula 2, as the current remaining number (range) is the number of bands to be coded, the current remaining number becomes proportional to the number of cases for representing the current section length overall. Hence, the bit number of the current section length is related to the number of cases. First of all, a first bit number of the current section length is a value resulting from taking logarithm of a base 2 on the current remaining number and then taking a cell function thereon. For instance, in case that a section length sect_len in FIG. 5 is '4', since a remaining number is '10', the first bit number becomes '4 (=ceil (log$_2$10))'. The first bit number means a temporary bit number determined with the remaining number (range) only. Finally, by way of comparing the first bit number and the fixed bit number A to each other, it is able to determine a smallest one of the two as a bit number of the current section length. In FIG. 5, in case that the first bit number is '4' and that the fixed bit number A is 3, the final bit number can be determined as 3.

Once the bit number B is calculated in the step S160 by the above-described method, a code value of 'temporary section length (sect_len_temp)−1' is generated based on the bit number B [S170]. For instance, in the cases shown in FIG. 5, if the temporary section length is '4', as the bit number is determined as 3, it is able to generate a 3-bit code value '011' that corresponds to 3 resulting from subtracting 1 from 4. Yet, if the bit number B is 0, the code value is not generated.

After completion of performing the coding on the section length for the single section, by adding a current section length to a current accumulative number [sfb_acc+=sect_len], a variable value is modified to prepare for a next section [S170]. Subsequently, if the current accumulative number sfb_acc is smaller than the maximum number max_sfb ['yes' in the step S180], it means that a section to be coded remains. The routine goes back to the step S120 and the steps S130 to S170 then keep being repeated to a last section.

First Example

Encoding process for the first example is explained with reference to FIG. 5 as follows.

First of all, 'A=3', 'max_sfb=10' and 'sfb_acc=0' are set [S110]. Since a section length sect_len of a first section is 4, allocation is performed in a manner of 'sect_len_temp=4' and it is calculated as 'range=10–0' [S120]. Since a value of 'sect_len_temp' is smaller than a reference number sect_esc_val ($2^3-1=7$) ['no' in the step S130], it is able obtain a result that a bit number B is 3 using a current remaining number (range=10) [S160]. A 3-bit code value '011' corresponding to 'sect_len_temp−1', i.e., '4−1=3' is then generated [S170]. Subsequently, 'sfb_acc' becomes 4 in a manner of adding 4 that is 'sect_len' at 0.

For a second section, a section length sect_len is '2' and a range becomes 6 resulting from '10−4'. Since '2' of the 'sect_len_temp' is smaller than 7 ['yes' in the step S130], '3' is obtained from calculating a bit number B [S160]. 3 bits code value '001' for 1(=2−1) is generated [S170].

Likewise, for a third section (sect_len=3), the step S140 and the step S150 are not performed. Instead, the steps S160 and S170 are performed to obtain a 2-bit code value '10'. Since a remaining number is 1 for a last section, a final bit number is 0. Hence, a code value is not generated. In particular, 'remaining number is 1' means the situation that a current section length has no choice but to become 1 (i.e., the number of cases for the section length is 0), a decoder is able to know that it is 1 without generating a code value.

In case of the first example, as mentioned in the above description, total 8 bits are used. It can be observed that total 4 bits are saved when compared to the case of the fixed bit number (12 bits) shown in (B) of FIG. 5.

Second Example

Encoding process for the second example is explained in detail with reference to FIG. 6 as follows. The first example is almost identical to the second example but differs in that a fixed bit number A is 5 and in that there exists a section length (e.g., 35) greater than a reference number sect_esc_val ($2^5-1=31$) which is a limit value expressible as the fixed bit number. Therefore, the steps S150 and S160 in FIG. 4 are performed.

Referring to FIG. 6, a section length sect_len_temp of a first section is 35, which is greater than '31' that is a reference value sect_esc_val ['yes' in the step S130]. Hence, a code value '11111' resulting from coding 31 of 'sect_esc_val' is generated using 5 bits and is then transferred [S140]. Thus, the coding for the partitioned section length '31' in the first section is completed. Subsequently, a value '4', which is a value resulting from subtracting '31' of 'sect_esc_val' from the previous sect_len_temp (35), is allocated to a new sect_len_temp again [S150]. And, a value 9, which is a value resulting from subtracting 31 of 'sect_esc_val' from the previous range (40), is allocated to a new range. A bit number 4 corresponding to the range 9 is calculated [S160]. A value 3, which is a value resulting from subtracting 1 from the sect_len_temp (4), is coded into a 4-bit code value '0011' [S170].

In case of the second example, as mentioned in the above description, total 12 bits are used. It can be observed that total 3 bits are saved when compared to the case of the fixed bit number (total 15 bits) shown in (B) of FIG. 6.

Figure 7:
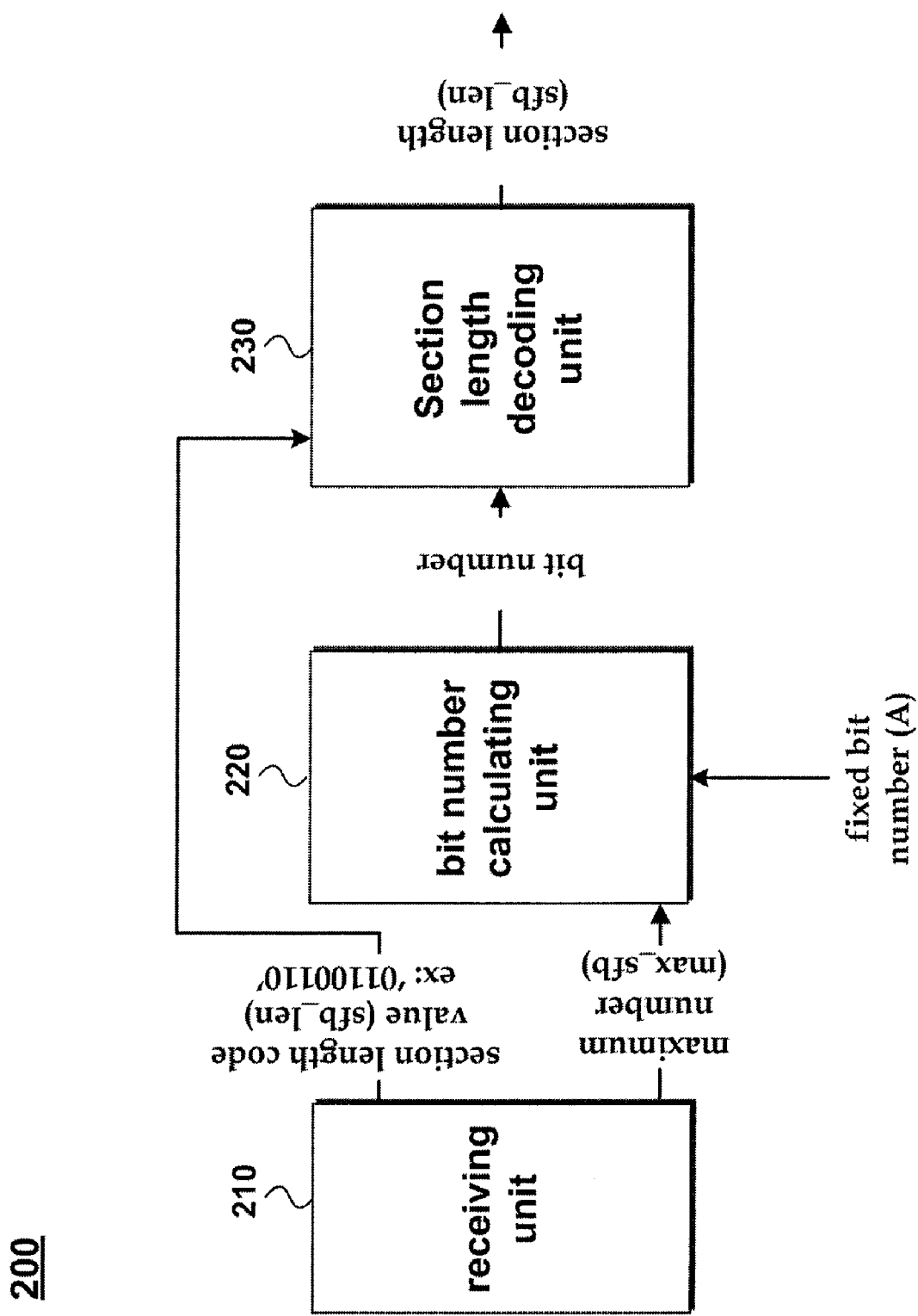
FIG. 7 is a configurational diagram of a signal decoding apparatus according to one embodiment of the present invention.
Figure 8:
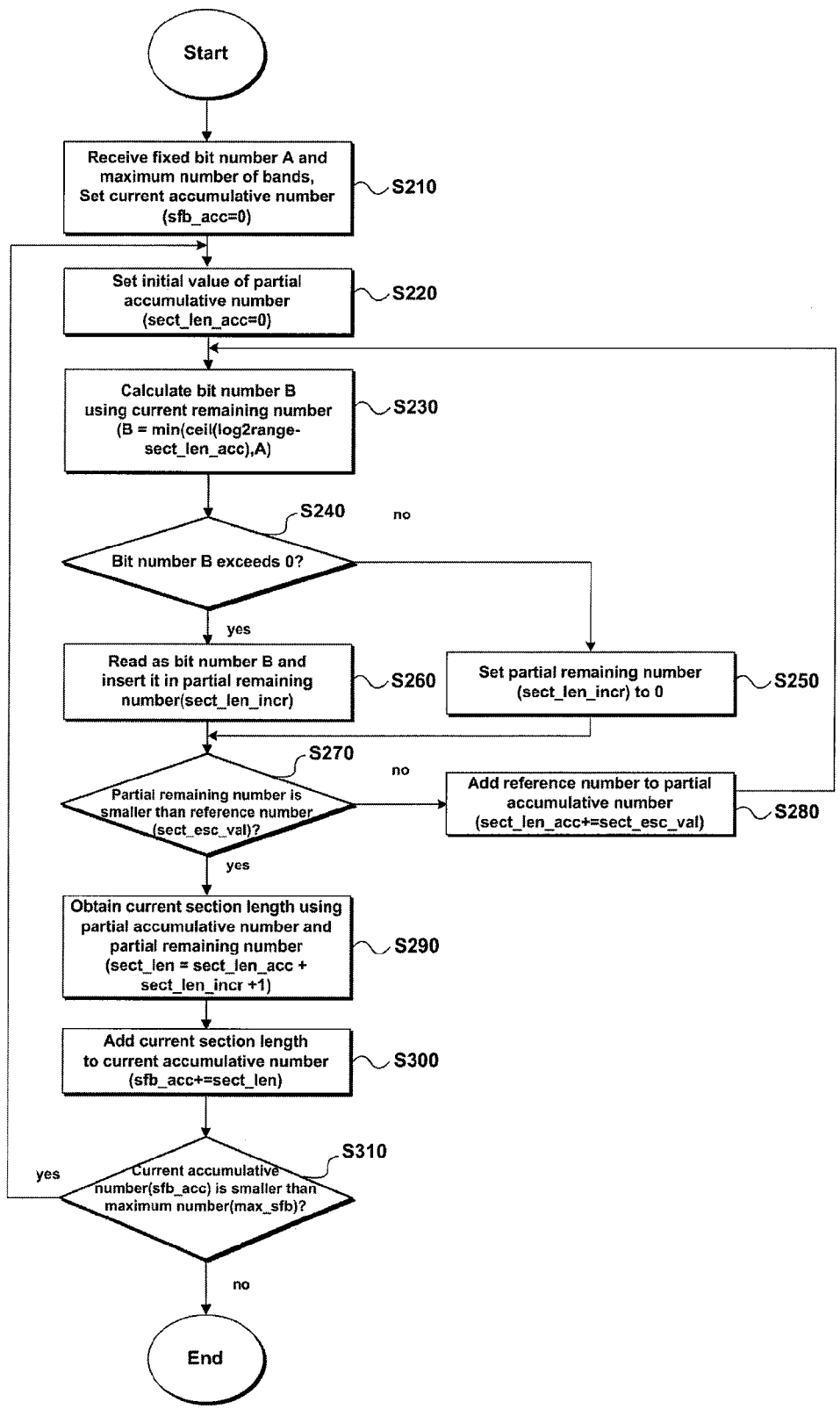
FIG. 8 is a flowchart of a signal decoding method according to one embodiment of the present invention.

FIG. 7 is a configurational diagram of a signal decoding apparatus according to one embodiment of the present invention, and FIG. 8 is a flowchart of a signal decoding method according to one embodiment of the present invention.

Referring to FIG. 7, a signal decoding apparatus 200 according to one embodiment of the present invention includes a receiving unit 210, a bit number calculating unit 220 and a section length decoding unit 230. The receiving unit 210 extracts a bitstream corresponding to section length code values sfb_len corresponding to at least one section from the bitstream and receives a maximum number max_sfb of scale factor bands. In this case, the maximum number max_sfb can be extracted from the bitstream or can be a value preset in a system. The bit number calculating unit 220 calculates a bit number of section lengths sfb_len corresponding to sections using the maximum number max_sfb (and a fixed bit number A). The second length decoding unit 230 obtains section length information by decoding the section length code vale based on the bit number.

The respective steps are explained in detail with reference to FIG. 8 as follows. First of all, after the fixed bit number A and the maximum number max_sfb of bands have been received, a current accumulative number sfb_acc is set to 0 [S210]. An initial value of a partial accumulative number sect_len acc is then set to 0 [S220]. In this case, the partial accumulative number sect_len_acc is a temporary value in the course of parsing or coding of a section length sect_len of a corresponding section. The partial accumulative number sect_len_acc starts from 0 and is a value incremented by a reference number sect_esc_val each time a value of the reference number sect_esc_val is detected.

Subsequently, a bit number B is calculated using a current remaining number (range) [S230]. In this case, the bit number B can be calculated by Formula 3.

$$B=\min(\mathrm{ceil}(\log_2(\mathrm{range}-\mathrm{sect\_len\_acc})),A),$$ [Formula 3]

where the min (x, y) is a minimum one of x and y, the ceil (z) is a smallest one of integers equal to or greater than z, the range is a current remaining number 'max_sfb−sfb_acc', the A is a fixed bit number, and the sect_len_acc is a partial accumulative number.

If the bit number B calculated in the step S230 does not exceed 0 ['yes' in the step S240] (i.e., the bit number is 0), the partial remaining number sect_len_incr is set to [S250]. If the bit number B exceeds 0 ['yes' in the step S240], a section length code value amounting to the bit number in a bitstream is read and then inserted in the partial remaining number sect_len_incr [S260]. In the case shown in FIG. 5, since 3 bits are determined for a first section, '011' amounting to 3 bits is read. The '011 (decimal number 3) is then inserted in the sect_len_incr. In case of a fourth section, as the bit number is determined as 0, the partial remaining number sect_len_incr is set to 0 without reading the code value.

Meanwhile, in case that the partial remaining number sect_len_incr is smaller than a reference number sect_esc_val ['yes' in the step S270], a current section length sect_len is obtained using the partial accumulative number sect_len_acc and the partial remaining number sect_len_incr [S290]. In this case, the section length can be obtained by Formula 4.

$$\mathrm{sect\_len}=\mathrm{sect\_len\ acc}+\mathrm{sect\_len\_incr}+1,$$ [Formula 4]

where the sect_len is a current section length, the sect_len_acc is a partial accumulative number, and the sect_len_incr is a partial remaining number.

Looking into Formula 4, in case that a value (e.g., '011') of the sect_len_incr is not the section length itself but a value resulting from subtracting 1 from the section length, plus 1 is necessary to obtain the section length. There is no case that the section length is 0. The section length exists only if it is equal to or greater than 1. Hence, as shown in the following table, it is able save at least 1 bit number in a manner that an encoder codes a value resulting from subtracting 1 from each section length and then transfers the coded value.

TABLE 1

Section Length Transfer Scheme

| Section length value | Encoder | Transmission value | Decoder |
|---|---|---|---|
| 0 | Not exist | Not exist | Not exist |
| 1 | Minus 1 (coding 0) | 0 | Plus 1 (restore 1) |
| 2 | Minus 1 (coding 1) | 1 | Plus 1 (restore 2) |
| 3 | Minus 1 (coding 2) | 2 | Plus 1 (restore 3) |

After completion of the step S290, a next section is prepared in a manner of adding a current section length sect_len to a current accumulative number sfb_acc [S300]. If the current accumulative number sfb_acc is smaller than a maximum number max_sfb (i.e., until a last section comes up), the steps S220 to S300 are repeated.

If the partial remaining number sect_len_incr is not smaller than the reference number sect_esc_val in the step S270, the reference number sect_esc_val is added to a previous partial accumulative number sect_len_acc and the routine then goes to the step S230 (sect_len act+=sect_esc_val) [S280].

In the following description, the decoding processes of the first and second examples are explained in detail.

First Example

In the following description, the decoding process of the first example is explained with reference to FIG. 5.

First of all, a value (A=3) of a fixed bit number and a value (max_sfb=10) of a maximum number are received and a current accumulative value sfb_acc is set to 0 [S210]. An initial value of a partial accumulative number sect_len_acc becomes 0 [S220]. Subsequently, a range (10) is calculated by subtracting sfb_acc(0) from max_sfb(10). Based on this, the following bit number (B=3) is calculated by performing substitution on Formula 3 [S230].

$$B = \min(\text{ceil}(\log_2(\text{range} - \text{sect\_len\_acc})), 3)$$
$$= \min(\text{ceil}(\log_2(10 - 0)), 3)$$
$$= \min(4, 3)$$
$$= 3$$

Subsequently, '011' amounting to 3 bits is read and then inserted in sect_len_incr [S260]. Since the sect_len_incr ('011'=3) is smaller than a reference number ($2^3-1=7$) ['yes' in the step S270], substitution is performed on Formula 4 to obtain a current section number (4) as follows [S290].

sect_len=sect_len acc+sect_len_incr+1=0+3+1=4

The above steps are repeated for second to fourth section.

Second Example

In the following description, the decoding process of the second example is explained with reference to FIG. 6.

First of all, a value (A=5) of a fixed bit number and a value (max_sfb=40) of a maximum number are received and a current accumulative value sfb_acc is set to 0 [S210]. An initial value of a partial accumulative number sect_len_acc becomes 0 [S220]. Subsequently, a range (40) is calculated by subtracting sfb_acc(0) from max_sfb(40). Based on this, the following bit number (B=5) is calculated by performing substitution on Formula 3 [S230].

$$B = \min(\text{ceil}(\log_2(\text{range} - \text{sect\_len\_acc})), 5)$$
$$= \min(\text{ceil}(\log_2(40 - 0)), 5)$$
$$= \min(6, 5)$$
$$= 5$$

Subsequently, '11111' amounting to 5 bits is read and then inserted in the partial remaining number sect_len_incr [S260]. In this case, the partial remaining number sect_len_incr is 31 and not smaller than the reference number (310 ['no' in the step S270]. Hence, a value of sect_len_acc (31=31+0) is changed by adding sect_esc_val (31) to the previous sect_len_acc(0) [S280].

Subsequently, the routine goes to the step S230 to calculate the following bit number [S230].

$$B = \min(\text{ceil}(\log_2(\text{range} - \text{sect\_len\_acc})), 5)$$
$$= \min(\text{ceil}(\log_2(40 - 31)), 5)$$
$$= \min(4, 5)$$
$$= 4$$

In this case, since the ceil($\log_2(40-31)$), which is a first bit number and amounts to 4, is smaller than the fixed bit number A, the first bit number becomes a final bit number B.

Subsequently, a 4-bit code value '0011 (decimal number 3)' is read. Using this, a current section length is obtained as follows.

sect_len=sect_len acc+sect_len_incr+1=31+3+1=35

As mentioned in the foregoing description, after the section length for the first section has been obtained, the steps S220 to S330 are repeatedly performed on a second section.

In the above-described encoding method and apparatus according to one embodiment of the present invention, length information of a target (e.g., section), of which maximum number is known, is coded with a variable bit number and the coded information is then transferred. In the above-described decoding method and apparatus according to one embodiment of the present invention, the length information code value represented as the variable bit number is interpreted to obtain the length information of the target (e.g., section).

In the following description, encoding and decoding methods and apparatus according to another embodiment of the present invention are explained with reference to FIGS. 9 to 16. The methods and apparatuses according to another embodiment of the present invention relate to efficient transmission of factor data (e.g., scale factor data, maximum number of scale factor bands, global gain, and the like.).

Figure 9:
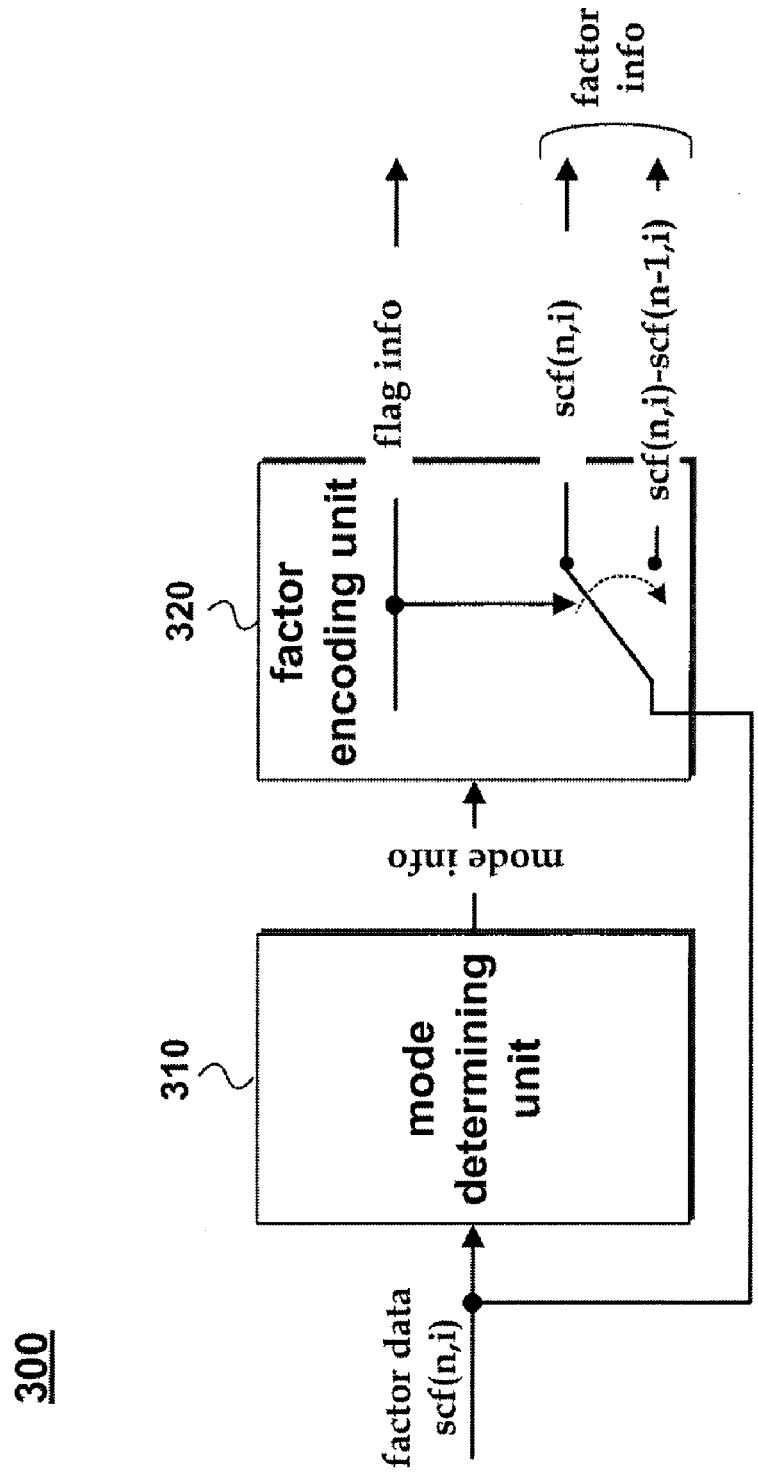
FIG. 9 is a configurational diagram of a signal encoding apparatus according to another embodiment of the present invention.
Figure 10:
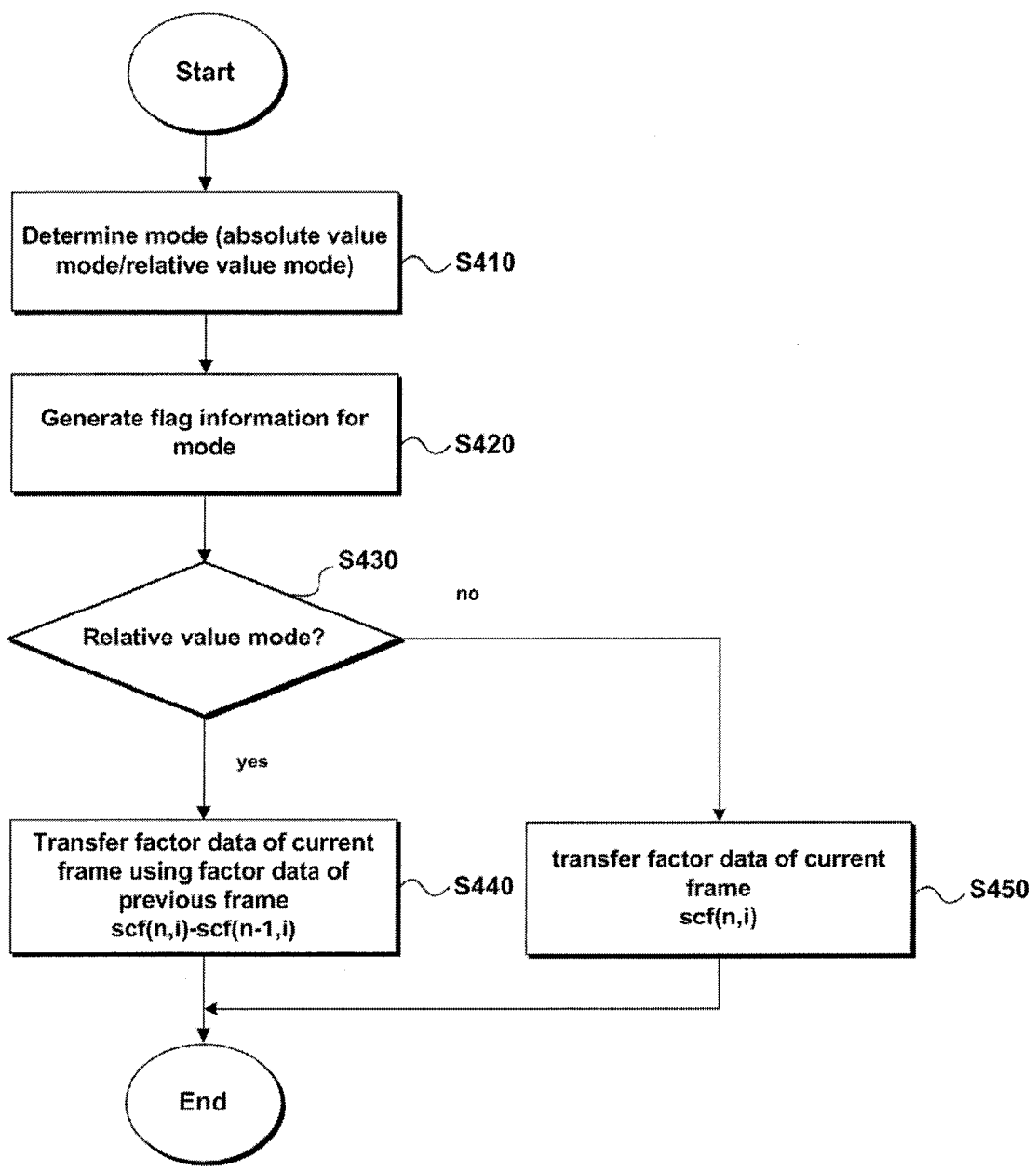
FIG. 10 is a flowchart of a signal encoding method according to another embodiment of the present invention.
Figure 13:
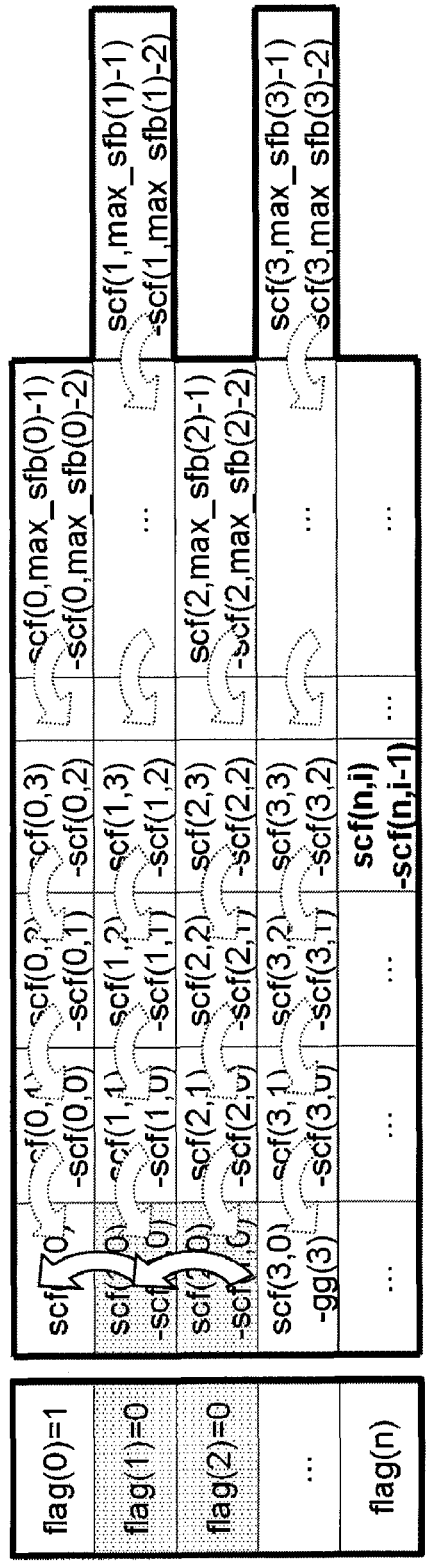
FIG. 13 is a diagram for a prediction direction in the transmitting scheme corresponding to (A) of FIG. 12 using arrows.
Figure 14:
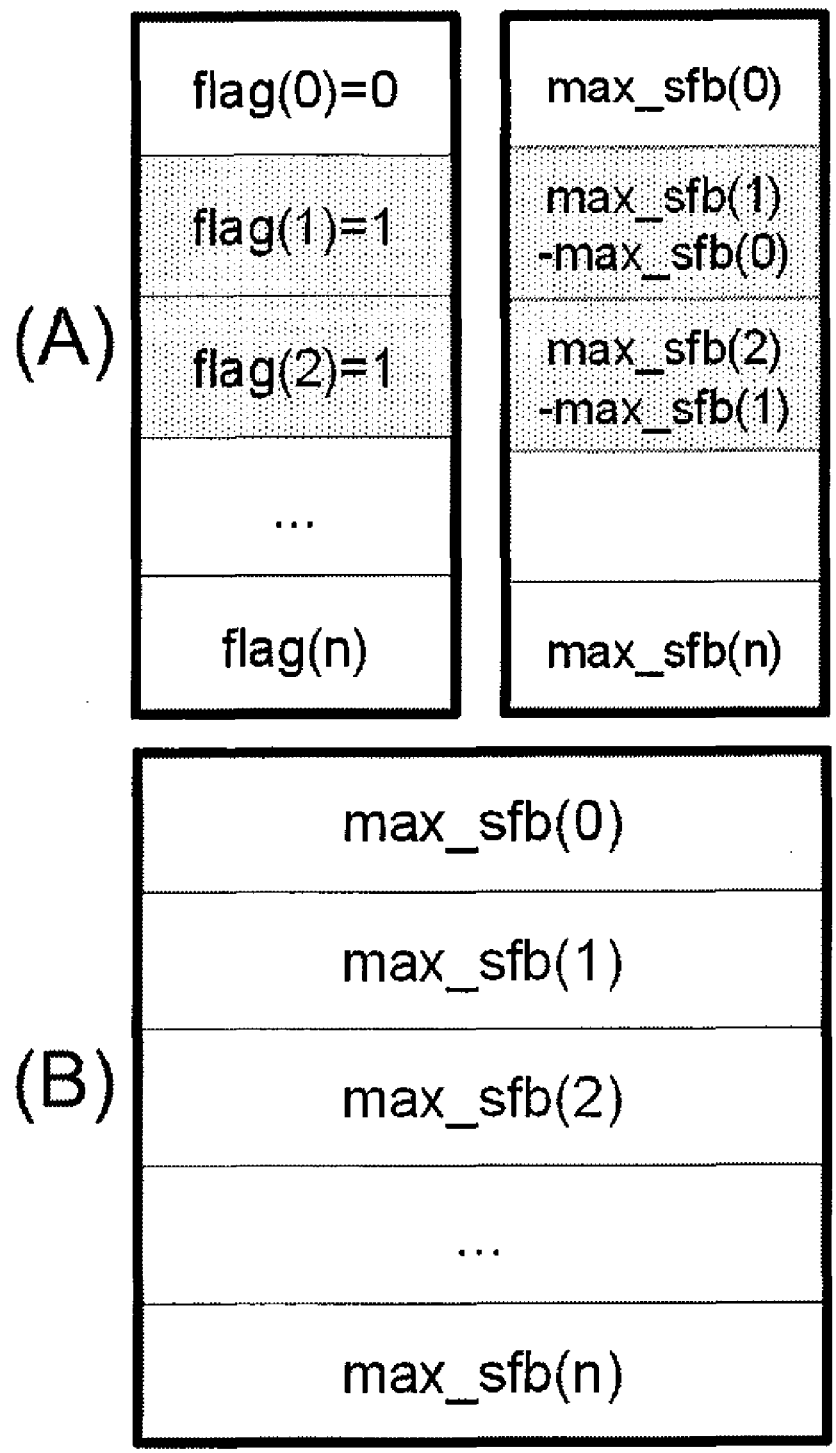
FIG. 14 is a diagram for explaining a transmitting scheme of the maximum number of scale factor bands.

FIG. 9 is a configurational diagram of a signal encoding apparatus according to another embodiment of the present invention, FIG. 10 is a flowchart of a signal encoding method according to another embodiment of the present invention, FIG. 11 is a diagram for explaining concepts of scale factor data and the maximum number of scale factor bands, FIG. 12 is a diagram for explaining a scheme for transmitting scale factor data, FIG. 13 is a diagram for a prediction direction in the transmitting scheme corresponding to (A) of FIG. 12 using arrows, and FIG. 14 is a diagram for explaining a transmitting scheme of the maximum number of scale factor bands.

Referring to FIG. 9 and FIG. 10, a signal encoding apparatus 300 according to another embodiment of the present invention includes a mode determining unit 310 and a factor encoding unit 320.

The mode determining unit 310 determines whether to set a transmission mode of factor data to an absolute value mode or a relative value mode using factor data. [S410]. In this case, the factor data can include at least one selected from the group consisting of scale factor data scf(n, i) and maximum number max_sfb(n) of scale factor bands. In (A) of FIG. 11, shown is a diagram for describing the scale factor data scf(n, i). In (B) of FIG. 11, shown is a diagram for describing the maximum number max_sfb(n) of scale factor bands.

First of all, referring to (A) of FIG. 11, the scale factor data scf(n, i) can exist from scale factor data scf(c, 0) for a first scale band (i=0) in a specific frame (n=c) to scale factor data scf(c, max_sfb(c)−1) for a last scale factor band (i=max_sfb (c)−1). Instead of transferring factor information (e.g., transmission value of scale factor data) on all scale factor bands, factor information on a prescribed scale factor band may not be transferred. In other words, in case that factor information on all scale factor bands is transferred, the number of factor-information-transferred bands and the number of factor informations may be equal to the maximum number max)sfb(n) of the scale factor bands. Otherwise, the number of factor-information-transferred bands and the number of factor informations may be smaller than the maximum number max)sfb(n) of the scale factor bands. The factor data scf(n, i) shown in FIG. 11 may correspond to the factor-information-transferred bands are transferred only. Hence, the scf(n, 0) may correspond to a first one of the entire bands or a first one of the factor-information-transferred bands. And, adjacent factor data may correspond to a band adjacent to a current band among the entire bands or may correspond to a band adjacent to a current one of the factor-information-transferred bands.

Referring to (B) of FIG. 11, a maximum number max_sfb (n) of scale factor bands is a value existing in each frame n.

Referring now to FIG. 9 and FIG. 10, the factor encoding unit 130 generates flag information based on the mode information determined in the step S410 and then transfers the generated flag information [S420]. In Table 1, a single flag can be collectively generated for both the maximum number of scale factor data and the maximum number of scale factor bands. In Table 3 and Table 4, first flag information on the maximum number of scale factor data and second flag information on the maximum number of scale factor bands can be separately generated.

TABLE 2

Meaning of Flag Information

| Flag | Meaning |
|---|---|
| 0 | Both maximum number of scale factor data and maximum number of scale factor bands are in absolute value mode |
| 1 | Both maximum number of scale factor data and maximum number of scale factor bands are in relative value mode |

TABLE 3

Meaning of First Flag Information

| $1^{st}$ Flag | Meaning |
|---|---|
| 0 | scale factor data is in absolute value mode |
| 1 | scale factor data is in relative value mode |

TABLE 3

Meaning of Second Flag Information

| $2^{nd}$ Flag | Meaning |
|---|---|
| 0 | maximum number of scale factor bands is in absolute value mode |
| 1 | maximum number of scale factor bands is in relative value mode |

Meanwhile, in case that the transmission mode (or coding mode) of factor data in a current frame is determined as the relative value mode in the step S410 ['yes' in the step S430], the factor encoding unit 320 does not transfer the factor data (scf(n,0), max_sfb(n)) of the current frame intactly. Instead, the factor encoding unit 320 generates a difference value (scf(n,0)−scf(n−1,0), max_sfb(n)−max_sfb(n−1)) from factor data (scf(n−1,0), max_sfb(n−1)) of a previous frame and then transfers the generated difference value as factor information [S440]. In this case, Huffman coding can be performed on the factor information corresponding to the relative value mode, by which examples of the present invention are non-limited. Meanwhile, Huffman codebook enables a method of creating a dedicated codebook for a global gain only. Yet, although a codebook of scale factor data is used, if a value is small, it is able to use less bits. Therefore, it is able to save bits less than those of the related art. If the transmission mode is determined as the absolute value mode in the step S430 ['no' in the step S430], the factor encoding unit 320 transfers the factor data (scf(n,0), max_sfb(n)) of the current frame as factor information [S450].

Referring to (A) of FIG. 12, a first scale factor data scf(0, 0) of a first frame (n=0) is in the absolute value mode and factor data is transferred intactly. Yet, it can be observed that first scale factor data of a second frame (n=1) is in the absolute value mode and a difference value (scf(1,0)−scf(0,0)) from factor data of a previous frame is transferred. And, it can be also observed that second scale factor data of a third frame (n=2) is in the absolute value mode and a difference value (scf(2,0)−scf(1,0)) from factor data of a previous frame is transferred. Thus, using the factor data of the previous frame corresponds to the first factor data only. For the second factor data, it is able to use the factor data of a previous band instead of the previous frame. Meanwhile, FIG. 13 is a diagram for a prediction direction in the transmitting scheme corresponding to (A) of FIG. 12 using arrows. Since data of a previous frame is referred to for first factor data, prediction is performed in a vertical direction. Since data of a previous band is referred to for factor data of behind the first, it is able to consider prediction in a horizontal direction as well.

Besides, a short frame can be constructed with a plurality of groups instead of being constructed with a single group. It is able to generate factor information in a manner of subtracting first scale factor data scf(n, 0) (not shown in the drawing) of a first group from first scale factor data scf(n, 0) (not shown in the drawing) of groups behind the first Meanwhile, the drawing shown in (B) of FIG. 12 represents an example for a comparison with the scheme shown in (A) of FIG. 12. Referring to (B) of FIG. 12, a global gain gg(n) for each frame is separately transferred. And, it can be observed that factor information on first scale factor data scf(n, 0) of a specific frame becomes a difference value (scf(n, 0)−gg(n)) from the global gain gg(n). The comparison example shown in (B) of FIG. 12 differs from the embodiment of the present invention in that the global gain is separately transferred and in that data of a previous frame is not used. Thus, the present invention transfers flag information flag(n) of a relatively small bit number (e.g., 1 bit) instead of transferring the global gain gg(n). Therefore, the present invention is able to save the bit number. Moreover, the present invention transfers the difference value from the data of the previous frame instead of transferring the factor data intact, thereby reducing the bit number required for transferring facto data.

FIG. 14 is a diagram for explaining a transmitting scheme of the maximum number of scale factor bands. In (A) of FIG. 14, shown is a scheme according to another embodiment of the present invention. In (B) of FIG. 4, shown is a comparison example. As mentioned in the foregoing description with reference to (A) of FIG. 12, in (A) of FIG. 14, a flag (flag (n)) is transferred. In case of a relative value mode (n=1 or 2), a maximum number max_sfb(n) of a scale factor band is not transferred intact. Instead, it can be observed that a difference value from a maximum number max_sfb(n−1) of a previous frame is transferred. In this case, if the flag (flag(n)) is integrated with a flag for scale factor data as shown in Table 2, the flag (flag(n) is identical to the flag shown in (A) of FIG. 12 and is not separately transferred. On the contrary, it can be observed that all maximum numbers max_sfb(n) of frames are transferred. Therefore, the present invention transfers a difference value of a previous frame, thereby saving the bit number.

Figure 15:
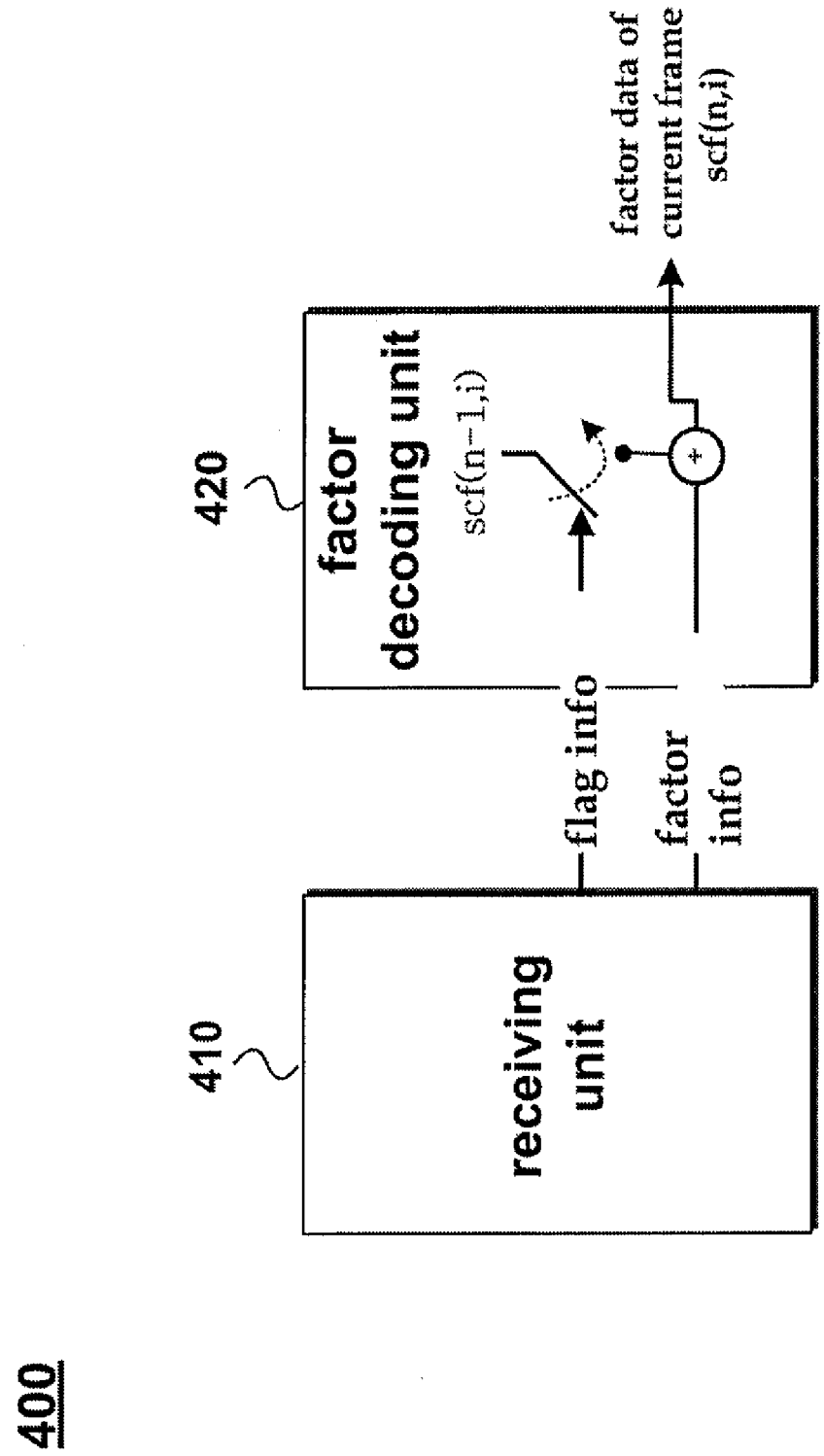
FIG. 15 is a configurational diagram of a signal decoding apparatus according to another embodiment of the present invention.
Figure 16:
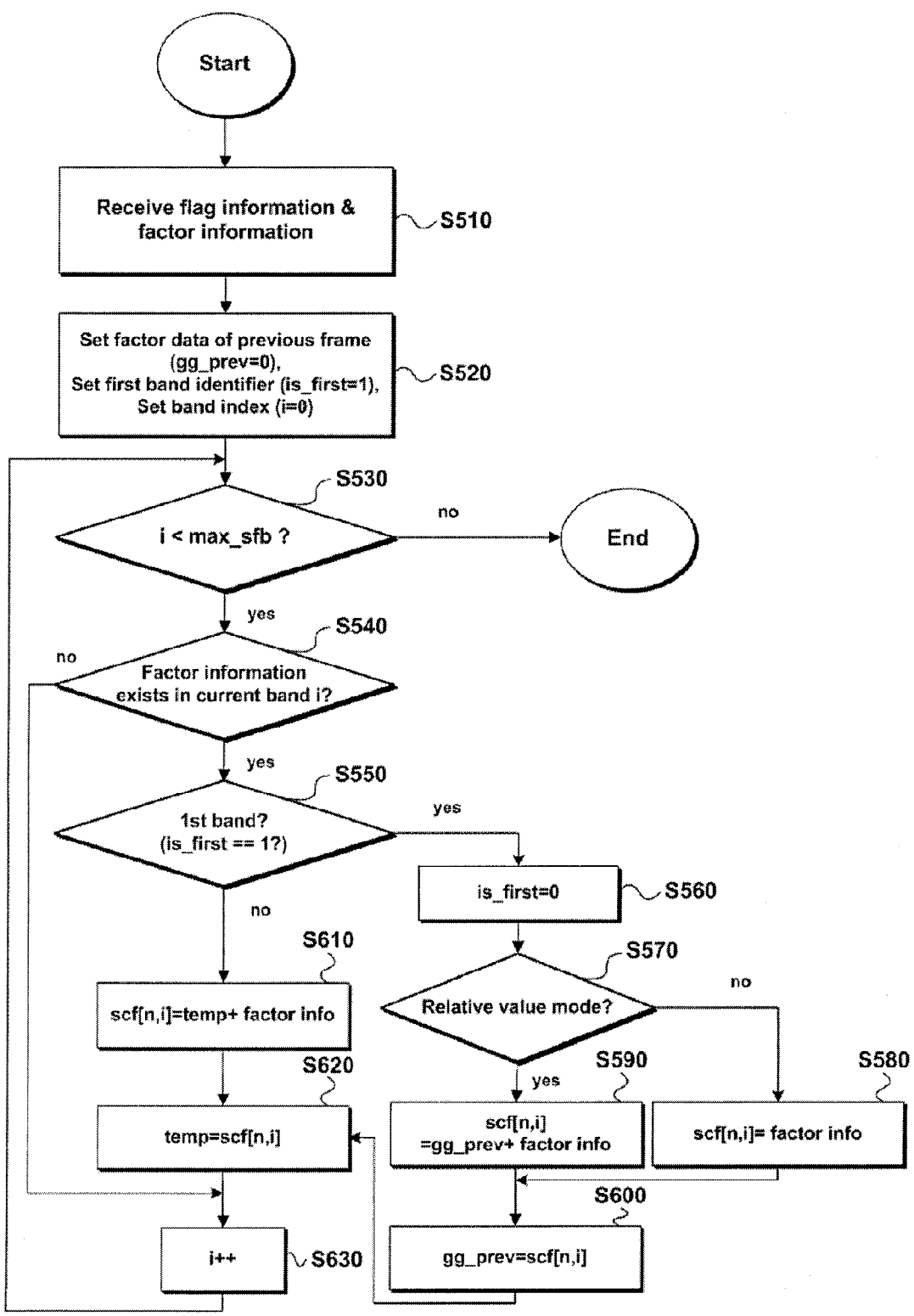
FIG. 16 is a flowchart of a signal decoding method according to another embodiment of the present invention.

FIG. 15 is a configurational diagram of a signal decoding apparatus according to another embodiment of the present invention, and FIG. 16 is a flowchart of a signal decoding method according to another embodiment of the present invention.

Referring to FIG. 15, a signal decoding apparatus 400 according to another embodiment of the present invention includes a receiving unit 410 and a factor decoding unit 420. The receiving unit 410 receives flag information and factor information from a bitstream. And, the factor decoding unit 420 generates factor data of a current frame based on the flag information. In the following description, detailed steps of a decoding process are explained with reference to FIG. 16.

Referring to FIG. 16, flag information and factor information are received [S510]. The flag information may be the same as explained with reference to Tables 2 to 4. The factor information is the information required for decoding factor data. In case of an absolute value mode, the factor information can be itself (scf(n,i), max_sfb(n)). In case of a relative value mode, the factor information can be a difference value (scf(n, i)−scf(n−1,i), max_sfb(n)−max_sfb(n−1)) from data of a previous frame.

Subsequently, factor data of a previous frame is set to 0 [gg_prev=0], a first band identifier is set (is_first=1), and a band index is set (i=0) [S520]. In this case, the factor data gg_prev of the previous frame is the factor data having decoding completed for the previous frame. The first band identifier is_first is the identifier that indicates whether a current band is a first band for a specific frame. The first band identifier is a value resulting from being set to 1 first and then set to 0 after completion of decoding of factor data for a next first band [S560].

If a current scale factor band i reaches a maximum number max_sfb of scale factor bands ['no' in the step S530], a procedure for a specific group is completed. And, the steps S540 to S630 are repeated until the maximum number is reached. Meanwhile, in case of a long frame, a single group configures a single frame. In case of a short frame, a plurality of groups configure a single frame. Hence, in case of the short frame, a procedure for a whole frame can be completed by repeatedly performing the steps S540 to S630 on a plurality of the groups.

Meanwhile, if the factor information does not exist in the current scale factor band i ['no' in the step S540], a procedure for a next band is executed by incrementing the band number [S630]. If the factor information exists in the current scale factor band i ['yes' in the step S540], it is determined whether a current band is a first band, i.e., whether the first band identifier is_first is 1 [S550]. If the current band is the first band ['yes' in the step S550], the first band identifier is_first is modified into 0 to prepare for bands next to the first [S560].

Subsequently, based on the flag information, it is determined whether the factor data for the first band is in the relative value mode or the absolute value mode [S570]. If the factor data for the first band is in the absolute value mode ['no' in the step S570], the current factor data scf(n, i) is equal to the decoded value of the transferred factor information [S580]. In this case, a global gain belonging to the same frame n of the current frame is not used.

If the factor data for the first band is in the relative value mode ['yes' in the step S570], the factor data scf(n, i) of the current frame is obtained using the factor data gg_prev of the previous frame and the transferred factor information (difference value) [S590]. Like the case of the absolute value mode, a global gain belonging to the same frame n of the current frame is not used as well.

Meanwhile, in case that factor data is scale factor data, an index offset index_offset can be further used. In this case, the index offset index_offset can be the number subtracted for an encoder to represent '−60~60' as '0~120' or the number for a decoder to restore '0~120' from '−60~60'.

Subsequently, the factor data obtained in the step S580 or S590 is set to previous frame data gg_prev (gg_prev=scf(n,i)) [S600]. Moreover, the factor data is set to temporary data temp as well (temp=scf(n,i)) [S620]. The previous frame data gg_prev is the information required for predicting the first band in a vertical direction. And, the temporary data temp is the information required for predicting bands after the first in a horizontal direction.

In case of the band after the first ['no' in the step S550], the factor data scf(n, i) of the current band is obtained using the factor data temp of the previous band and the transferred factor information [S610]. In this case, likewise, the aforesaid index offset index_offset can be further used. Subsequently, for a next band, the factor data obtained in the step S610 is inserted in the temporary data temp (temp=scf(n,i)) [S620].

By incrementing the band index i (S630), the steps S530 to s630 are repeatedly performed on the next band.

INDUSTRIAL APPLICABILITY

Accordingly, the present invention is applicable to perform encoding/decoding an audio or video signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of processing a signal, comprising:
receiving a maximum number of band and at least one code value of section length;
calculating a bit number corresponding to the at least one code value of section length using the maximum number of the band; and
obtaining section length information by decoding the code value of the section length based on the bit number,
wherein the band corresponds to a scale factor band, wherein a section comprises consecutive bands using a same codebook, and wherein the section length corresponds to a number of the consecutive bands.

2. The method of claim 1, wherein the calculating of the bit number comprising:
calculating a current remaining number using the maximum number and a current accumulative number; and
calculating the bit number corresponding to the at least one code value of section length using the current remaining number,
wherein the current accumulative number corresponds to a number of parsing completed bands, and wherein the current remaining number corresponds to a number of parsing incomplete bands.

3. The method of claim 1, wherein the bit number is calculated based on a fixed bit number.

4. The method of claim 3, wherein the calculating of the bit number comprising:
calculating a first bit number corresponding to the at least one code value of section length using the maximum number of the band; and
determining one of the first bit number and the fixed bit number as the bit number corresponding to the code value of the section length.

5. The method of claim 1, wherein the obtaining of the section length information comprising:
decoding the code value of the section length based on the bit number; and
obtaining the section length information by adding 1 to the decoded value.

6. An apparatus for processing a signal, comprising:
a receiving unit receiving a maximum number of band and at least one code value of section length;
a bit number calculating unit calculating a bit number corresponding to the at least one of section length using the maximum number of the band; and
a section length decoding unit obtaining the section length information by decoding the code value of the section length based on the bit number,
wherein the band corresponds to a scale factor band, wherein a section comprises consecutive bands using a same codebook, and wherein the section length corresponds to a number of the consecutive bands.

7. The apparatus of claim 6, wherein the bit number calculating unit calculates a current remaining number using the maximum number and a current accumulative number and calculates the bit number corresponding to the code value of at least one section length using the current remaining number, wherein the current accumulative number corresponds to a number of parsing completed bands and wherein the current remaining number corresponds to a number of parsing incomplete bands.

8. The apparatus of claim 6, wherein the bit number calculating unit calculates the bit number based on a fixed bit number.

9. The apparatus of claim 8, wherein the bit number calculating unit calculates a first bit number corresponding to the code value of the at least one section length using the maximum number of the band and then determines either the first bit number or the fixed bit number as the bit number corresponding to the code value of the section length.

10. The apparatus of claim 6, wherein the section length decoding unit decodes the code value of the section length based on the bit number and obtains the section length information by adding 1 to the decoded value.

11. A method of processing a signal, comprising:
receiving a maximum number of band and a code value of at least one section length;
calculating a bit number corresponding to the code value of the at least one section length using the maximum number of the band; and
generating the code value of the section length by encoding the section length based on the bit number,
wherein the band corresponds to a scale factor band, wherein a section comprises consecutive bands using a same codebook, and wherein the section length corresponds to a number of the consecutive bands.

12. A method of processing a signal, comprising:
receiving a maximum number of band and a code value of at least one section length;
calculating a bit number corresponding to the code value of the at least one section length using a current remaining number; and
obtaining the section length information by decoding the code value of the section length based on the bit number,
wherein the current remaining number corresponds to a number of parsing incomplete bands and wherein the current remaining number is determined based on the maximum number and a current accumulative number.

13. An apparatus for processing a signal, comprising:
a receiving unit receiving a maximum number of band and a code value of at least one section length;
a bit number calculating unit calculating a bit number corresponding to the code value of the at least one section length using a current remaining number; and
a section length decoding unit obtaining the section length information by decoding the code value of the section length based on the bit number,
wherein the current remaining number corresponds to a number of parsing incompleted bands and wherein the current remaining number is determined based on the maximum number and a current accumulative number.

* * * * *